United States Patent [19]

Nagasawa et al.

[11] 4,443,097
[45] Apr. 17, 1984

[54] EXPOSURE VALUE CONTROL SYSTEM FOR COPYING MACHINES

[75] Inventors: Kiyoto Nagasawa, Yokohama; Hiroshi Yamada, Ichikawa, both of Japan

[73] Assignee: Ricoh Company, Ltd., Tokyo, Japan

[21] Appl. No.: 294,140

[22] Filed: Aug. 19, 1981

[30] Foreign Application Priority Data

Aug. 23, 1980 [JP] Japan .............................. 55-115350

[51] Int. Cl.³ ............................................. G03B 27/72
[52] U.S. Cl. ..................................................... 355/68
[58] Field of Search ...................... 355/68, 69, 35, 37, 355/38, 7 D; 315/158

[56] References Cited

U.S. PATENT DOCUMENTS

| | | | |
|---|---|---|---|
| 3,599,037 | 8/1971 | Grace | 315/158 X |
| 4,124,294 | 11/1978 | Nakamura | 355/69 X |
| 4,246,517 | 1/1981 | Dakroub | 355/69 X |
| 4,290,692 | 9/1981 | Sucitek | 355/69 |
| 4,299,451 | 11/1981 | Task et al. | 355/69 X |

*Primary Examiner*—Michael L. Gellner
*Attorney, Agent, or Firm*—Guy W. Shoup; Gerard F. Dunne

[57] ABSTRACT

An exposure value control system for a copying machine of the narrow slit exposure type in which a fluorescent lamp and a fiber lens array are used as a source of light and an imaging optical system, respectively. This exposure value control system comprises a lighting device for the fluorescent lamp, a manually-adjustable D-C voltage generator, and control means for electrically controlling a lamp current supplied from the lighting device to the fluorescent lamp in dependence upon the D-C voltage from the generator.

6 Claims, 11 Drawing Figures

PRIOR ART
FIG. 1a
PRIOR ART
FIG. 1b
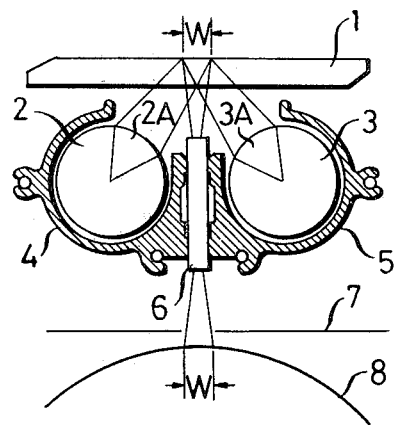
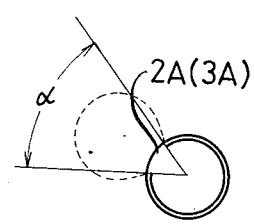
FIG. 2
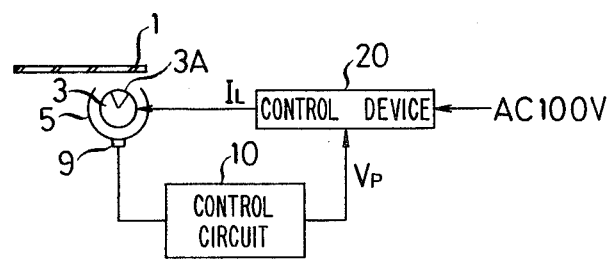

FIG. 3
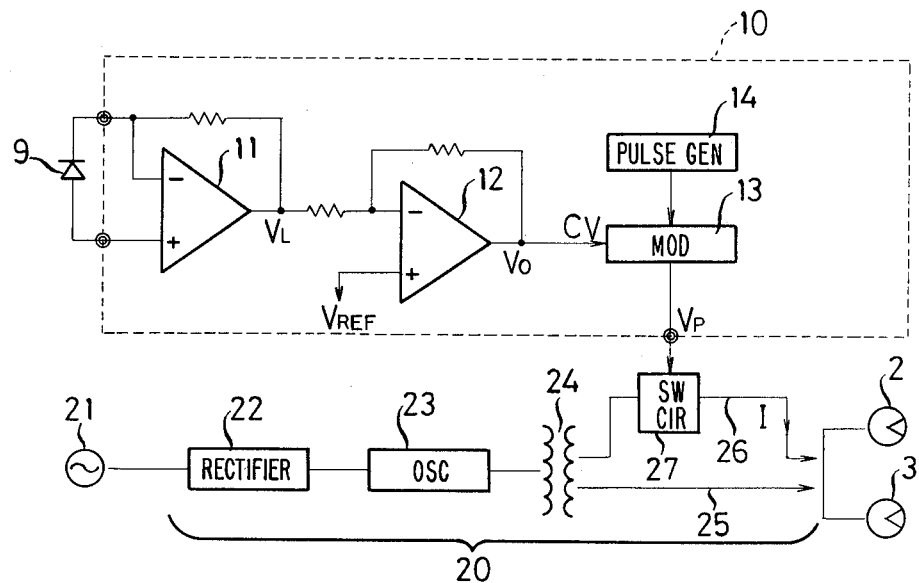
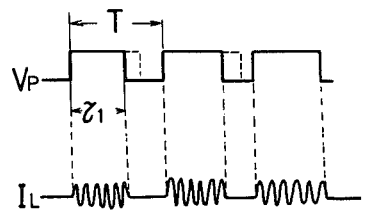
FIG. 4
FIG. 5a
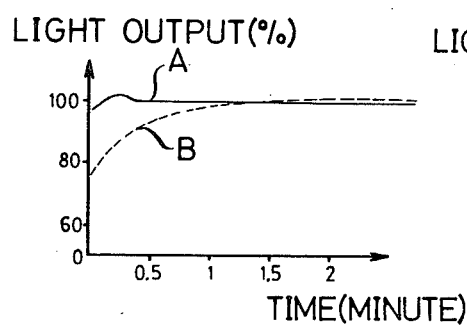
FIG. 5b
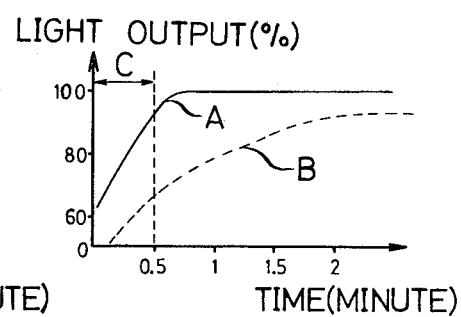

EXPOSURE VALUE CONTROL SYSTEM FOR COPYING MACHINES

BACKGROUND OF THE INVENTION

This invention relates to an exposure device for a copying machine wherein a fluorescent lamp and a fiber lens array are used as a light source and image formation means, respectively, and particularly to an exposure value control system therefor.

The fiber lens described herein is a glass or plastic focusing fiber generally known under a trade name "SELFOC", for example, and whose index of refraction varies consecutively in the radial direction with its axis. Imaging functions can be obtained by cutting the focusing fiber into an appropriate length, and it can therefore be utilized as a substitute for an optical system employing conventional lenses and mirrors. As compared with the case where a more conventional optical system employing lenses or the like is used, the entire exposure device formed of a fiber lens can be made very compact since the optical path length between an original support station and an image forming surface on a photosensitive member can be greatly reduced.

In addition, the use of a fluorescent lamp as the light source is very advantageous in view of the amount of heat generated. When an ordinary tungsten-halogen lamp is used, a temperature at a tube wall may be more than approximately 300° C. In the case of a fluorescent lamp, however, the temperature at the tube wall may lie between 60° C. and 80° C. Therefore, the temperature rise therearound is very low for the latter. Fluorescent lamps are used with a fiber lens array because the fiber array is likely to be affected by high temperature, i.e., its color or the like may change, for example.

In FIG. 1a, there is illustrated an exposure device for a copying machine in which a fiber lens array is used in an imaging optical system. An original placed on a contact glass 1 is illuminated by two fluorescent lamps 2 and 3, and the original image to be copied is projected on a photosensitive member 8 through a fiber lens array 6. Since the surface of the photosensitive member 8 is electrostatically charged in advance with a corona charger, an electrostatic latent image corresponding to the image of the original is formed on the surface thereof. The electrostatic latent image is developed, transferred to a record paper and fixed to obtain the desired copy in accordance with a conventional copying process. In addition, reference numerals 4 and 5 show lamp casings, and 7 shows a protection slit for preventing stray light from reaching the photosensitive member 8.

In case where such fiber lens array 6 as described above is used, it is a general tendency that the width W of the area of the origianl exposed at any one time becomes less than approximately one-forth of the comparable width for the case of the conventional lens optical system, so that a mechanical setting of a selected level exposure becomes rather difficult.

It had been known that the selection or control of the exposure level or value can be accomplished by mechanically selecting or adjusting the width of a slit, such as the slit 7, which is disposed in an optical path extending from the original to the photosensitive member, but the demand for high tolerance for the shape of the slit and the attachment thereof is extremely severe because the width W for exposure is relatively narrow. Thus, it is practically difficult to provide such a slit, particularly when the room available for the slit is substantially reduce in a compact fiber lens system. Furthermore a change in the slit width does not always provide a uniform change in the exposure level. In other words, the change of light output as the slit width is enlarged by an increment of 1 mm from zero will not be linear, or causes very small and large portions in its variation ratio, thus making the control of exposure non-uniform.

In addition, it has also been known to those skilled in the art that the control of the exposure value can be performed by rotating a fluorescent lamp of aperture-type which may effectively illuminate the area of narrow exposure width W. As shown in FIG. 1b, the aperture-type fluorescent lamp has an aperture portion 2A or 3A formed in such a manner that the portion corresponding to an aperture angle $\alpha$ inside the lamp would not be painted with fluorescent material. Therefore, this lamp has a light distribution characteristic represented by dotted lines. A method of adjusting the exposure by turning such aperture-type fluorescent lamps as explained above includes the disadvantages that the mechanism for turning the lamp is complex, contact failure is apt to occur in a pin portion of the lamp because the lamp is rotated, and the lamp itself becomes rather expensive.

From the standpoint of stability in the amount of exposure, light output from a source of light generally vary with a change in the ambient temperature, voltage variation of a power source, degradation of the lamp through aging, and other factors. Although various lamps can be used as a light source for an exposure device, the ambient temperature around a fluorescent lamp largely affects its variation of light output. In the case of a fluorescent lamp, the luminous efficiency of the lamp drops remarkably in a low temperature environment and the light output. immediately after lighting is as low as 30% of the output at steady state. In an exposure device, i.e., an image forming device for a copying machine, if the light output of a light source lamp, namely, the amount of exposure changes, there occurs an unevenness in concentration in each copy or a difference in concentration from copy to copy, and the desired copy quality can not be obtained. As an exposure amount stabilization device, an indirect exposure amount stabilization system is known to those skilled in the art in which the light output of the lamp is stabilized by detecting a lamp voltage, lamp current or power source potential and thereafter feeding it back to a lighting device. This system, however, is effective for only a light souce lamp wherein its electrical characteristics or luminous properties are primarily determined by its electrical characteristics, as in the case of tungsten lamps, and therefore it is not suitable for a fluorescent lamp because the light output of the fluorescent lamp varies largely with its ambient temperature. In other words, a satisfactory effect for stabilization by such systems can not be expected for the fluorescent lamp. To solve this problem, the aforesaid exposure amount stabilization device has already been proposed in which the light output of lamp is stabilized by receiving lamp light by use of light receiving elements and feeding it back to a lighting device.

Admitting that there is a difference of whether the stabilization is effected indirectly by detecting the power source potential, ambient temperature and the like, or directly by sensing the light output, the output of the lamp in the lighting device is regulated by varying its supply voltage in dependence upon the magnitude of the detected values. Accordingly, in this kind of exposure amount stabilization device, it is ordinary practice to cause the lighting device for a light source lamp to have a power supply of a larger capacity than the rated power of the lamp, and to utilize its difference as a margin for absorbing the change of light output caused by various variation factors. In order to absorb the entire variations of light output in a lamp which provides extremely large variations in light output as in the case of a fluorescent lamp, the capacity of the power supply of the lighting device must be made large enough to meet its demand. Such power supply, however, would be of excessive quality for absorption of the variation under ordinary service conditions, would increase the size of the stabilization device itself, raises the production costs thereof, and provides adverse effects on the life expectancy of the lamp.

So far as the fluorescent lamps is concerned, it is unavoidable that the luminous efficiency of the fluorescent lamp, especially at low ambient temperatures, is reduced remarkably and the light output immediately after lighting becomes approximately 30% as compared with that at its steady state, but such large variation as this will occur only when the ambient temperature is less than 10° C. and at the time of lighting or starting, so that occurrence of such condition is infrequent. Thus, it is not economical to prepare a large capacity power supply for the lighting device capable of absorbing all variations, when some may occur infrequently.

If a lighting device having a relatively small power supply is employed and the possibility of occurrence of large variation of light output at the time of starting is neglected a blank period will be produced during which unclear copies may be produced by the copying machine since the variation of light output can not be compensated for by the regulating capacity of the stabilization device during initial operation.

Although it has been known to heat the tube wall of the fluorescent lamp is preliminarily to reduce the variation of light output at the time of lighting or starting, it has such drawbacks that any heating means, which may often exhibit a safety problem, such as a surface heater and the like is required. Such devices complicate construction and elevate the production costs, and the preliminary heating must be maintained even during a wait-to-see period or when the exposure device is not in operation.

From the foregoing, it is preferable to have such counter-measures that the stabilization device is designed so as to accurately cover a given range of ±30%, for example, with respect to the variation of light output in the lamp, and that the dealer or manufacturer advices the user to use the exposure device only after it has been placed under its steady state since the device itself is not so designed that it can absorb larger variations exceeding ±30%, thereby preventing the excessive quality of the lighting device.

SUMMARY OF THE INVENTION

It is therefore a primary object of the subject invention to provide an exposure control system wherein an optical system which intrinsically exhibits a very narrow exposure width ranging from 4 mm to 6 mm as in the case of a fiber lens array and the like is used as imaging means for an exposure device in a copying machine, thereby offering good efficiency and proportional characteristics between the set point of the selective setting means and the exposure valve produced thereby.

The abovementioned object and advantages of the present invention can be accomplished by electrically adjusting the light output of the fluorescent lamp and then by additionally providing a stabilizing function that the adjusted light output is regulated constant at that value to obtain the high-quality copies.

BRIEF DESCRIPTION OF THE DRIVINGS

The novel feature of the subject invention, as well as the invention itself, and the objects and advantages thereof will be better understood from the following description taken in conjunction with the accompanying drawings in which:

FIG. 1a shows an example of conventional exposure device using a focusing fiber lens array and fluorescent lamps;

FIG. 1b shows a schematic diagram useful for explaining an aperture angle for an aperture-type fluorescent lamp;

FIG. 2 shows a schematic view illustrating one of the embodiments of an exposure value control system in accordance with the present invention;

FIG. 3 shows a block diagram illustrating a control circuit;

FIG. 4 shows a diagram illustrating waveforms for control pulses supplied from the control circuit in FIG. 3 and a lamp current corresponding thereto;

FIGS. 5a and 5b show diagrams wherein the variation characteristics of light output seen at a time when the fluorescent lamps are started are illustrated;

DESCRIPTION OF THE PREFERRED EMBODIMENTS

Figure 6:
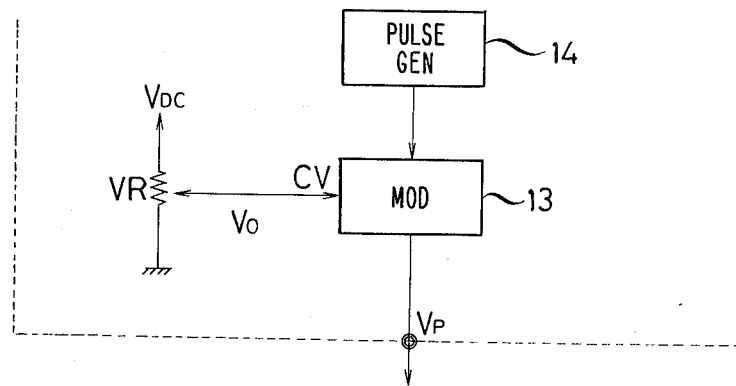
FIG. 6 shows a block diagram for a simple exposure valve control system not having a circuit which automatically compensates for the variation of light output.

The exposure value control system in accordance with the present invention will be hereinafter explained by referring to the embodiments illustrated in the appended drawings.

FIG. 2 schematically shows the entire construction of an exposure value control system in accordance with the present invention, which includes the exposure device already explained in connection with FIG. 1. As previously explained, the original is successively fed over the original supporting glass 1, and a portion of the original surface placed on the supporting glass is uniformly illuminated from the underside by means of the two fluorescent lamps 2 and 3 as exposure lamps which are of the aperture type. The remaining region other than the aperture portions 2A and 3A are covered by the lamp casings 4 and 5 (FIG. 1). The light reflected from the illuminated original is led through the focusing fiber lens array 6 (FIG. 1) to a photosensitive member 8 (FIG. 1) which is uniformly electrostatically charged in advance, and imaged thereon in compliance with the picture of the original to form an electrostatic latent image on the photosensitive member that is thereafter to be developed by a toner. Then, the toner image is transferred to a record paper and finally fixed to obtain the desired copy. A light receiver 9 is arranged in a position from which either one or both of the fluorescent lamps can be viewed for detecting the light output of the lamps. In the embodiment illustrated in FIG. 2, the light receiver includes a photodiode 9 disposed at the rear side of the fluorescent lamp 3. The photocurrent obtained by the photodiode 9 corresponds to the light output of the lamps and is inputted into a control circuit 10. A light dimmer stabilizer 20 or lighting control device is connected to the fluoresent lamps 2 and 3 and is gated by control pulses generated from the control circuit 10. The lamp current $I_L$ from the dimmer stabilizer 20 to the fluorescent lamps 2 and 3 is controlled in such a manner that the light output of the fluorescent lamp 3 is made constant as a whole.

In FIG. 3, the lighting control device 20 is constructed as a high frequency type stabilizer and includes an oscillator 23 which is energized by a rectifier circuit 22 connected to a commercial power source 21. The fluorescent lamps 2 and 3 are connected to the secondary side of an output transformer 24 of the oscillator 23. A line 25 leading from the secondary side of the output transformer 24 to the fluorescent lamps 2 and 3 represents a filament current circuit and a line 26 shows a lamp current circuit. A switching circuit 27 is inserted in the lamp current circuit 26 for turning on and off the lamp current $I_L$, and is controlled by the control circuit 10.

The reason why the high frequency type stabilizer is used as a lighting device is that, first of all, the stabilizer can be made compact and light in weight. Next, in the case of a narrow exposure width illumination system, a problem of flickering due to the power source of the lamp is unavoidable. If there occurs effects of flickering, the copy may have an irregularity of concentration in a pattern striped, and thus the quality of the copy is degraded conspicuously. The magnitude of influence resulted from flickering generally depends upon a linear velocity V of the photosensitive member, a power-source frequency f for the light source lamp and the exposure width W, and the effect thereof is conspicuous as the linear velocity is faster, the frequency f is lower and the width W is narrower. Since the linear velocity V and the exposure width W are determined by other factors to be required for the copying machine, it is necessary to increase the power-source frequency f of the light source in order to reduce the effects of flickering. In addition, in the case of a discharge tube such as a fluorescent lamp, the luminous efficiency will be improved as its frequency becomes higher.

Disposed in the control circuit 10 is an operational amplifier 11 which functions as a photocurrent-voltage converter, the noninverting input terminal thereof is connected to the anode of the photodiode 9 and the inverted input terminal thereof is connected to the cathode thereof. Thus, the output $V_L$ of the operational amplifier 11 becomes higher as the amount of light of the fluorescent lamps 2 and 3 and thus the photocurrent of the photodiode 9 becomes larger. The output voltage $V_L$ of the operational amplifier 11 is applied to the inverted input terminal of an operational amplifier 12 which functions as a comparison amplifier, and compared therein with a reference voltage $V_{REF}$ applied to the noninverting input terminal of the operational amplifier 12. The operational amplifier 12 compares the D-C voltage $V_L$ with the reference voltage $V_{REF}$ and then outputs a voltage $V_O$ proportional to a deviation amount ($V_{REF}-V_L$) with respect to the reference voltage $V_{REF}$. The voltage $V_O$ is fed to the input terminal CV of a pulse-width modulator 13 consisting of a monostable multivibrator. To the other input terminal of the pulse-width modulator 13, a pulse train from a pulse generator 14 comprising a free-running multivibrator is always supplied. A duty ratio D of the pulse train is represented by Ti/T; where T represents a repetition period and Ti represents a pulse width. The pulse-width modulator 13 varies the duty ratio D of the pulse train supplied from the pulse generator 14 in such a manner that the duty ratio is augmented as the D-C voltage $V_O$ inputted to the input terminal CV becomes larger. Thus, the output of the pulse-width modulator 13, that is, the output pulse train $V_P$ of the control circuit 10 becomes a square waveform of the duty ration which varies in response to the output voltage of the operational amplifier 12, as indicated by dotted lines in FIG. 4. As a result, the energizing period of the switching circuit 27 which carries the lamp current $I_L$ is also varied.

The output pulse train $V_P$ of the control circuit 10 is supplied to the switching circuit 27 in the dimmer stabilizer 20. The switching circuit 27 is turned on for only a period corresponding to one pulse width in each repetitive period of the pulse train $V_P$ and causes the lamp current to flow therethrough. The larger the value of duty ratio D of the pulse train $V_P$, the longer the period during which the lamp current flows or the larger will be the average lamp power. Contrary to this, the smaller the value of the duty ratio D, the smaller the average lamp power.

Assuming now that the amount of light of the fluorescent lamp 2 or 3 is reduced with respect to a given setpoint for any reason, the photocurrent of the photodiode 9 is decreased and the output $V_L$ of the operational amplifier 11 is also lowered. The operational amplifier 12 at the subsequent stage produces as output $V_O$ a voltage proportional to the difference ($V_{REF}-V_L$) between the reference voltage $V_{REF}$ and the output $V_L$. Consequently, the output $V_O$ of the operational amplifier 12, and thus the input of the pulse-width modulator 13 rises as the output $V_L$ goes low, and the duty ratio D of the output pulse train $V_P$ from the pulse-width modulator 13 is augmented. Therefore, the on-period of the switching circuit 27, that is, the continuity period for lamp current becomes longer, and the average lamp power is increased to enhance the light output.

Contrary to this, when the light output observed at the photodiode 9 is increased, the duty ratio D of the output pulse train $V_P$ becomes smaller, and the average lamp power is reduced to decrease its light output.

Eventually, since this system functions as a whole in such a manner that the input $V_L$ of the operational amplifier 12 used as an comparison amplifier becomes equal to $V_{REF}$, the light output will be maintained at a certain constant valve. As the result, the amount of light irradiated on the surface of the original can be thereby kept constant to decrease the irregular concentration on the copy and to assure the acqusition of copies of excellent quality. Equivalent effects can be obtained by disposing the photodiode 9 on the substrate for the control circuit 10, and leading the light output of the flourescent lamp up to the photodiode 9 by use of an optical fiber to detect it indirectly.

The amount of exposure can be set to any value by changing the reference voltage $V_{REF}$ of the operational amplifier 12 to adjust the light output of the fluorescent lamp. Consequently, according to the present invention, the amount of exposure in the exposure device can be advantageously maintained constant by fully compensating for the rapid variation of light output at the time of starting the fluorescent lamp, voltage fluctuation of the power supply and the variation of light output resulted from the drop of light output due to the degradation of the lamp and the like, and the exposure value control will become possible.

Since the aforesaid device according to the present invention is of the type wherein the amount of exposure can be varied by electrically adjusting the light output of the fluorescent lamp, there is no structural complexity due to conventional mechanical adjustment for the amount of exposure, and such restrictions as the minimal space for mounting and others are eliminated. Besides, it exhibits a uniform characteristic for the variation of light output at a time when the reference voltage $V_{REF}$ is varied, so that an accurate, smooth exposure value control is possible and the controllability of an exposure control lever is greatly improved.

Referring now to FIGS. 5a and 5b, a curve A represents how the light output (%) rises from the start of lighting with the lapse of time (minute) when the present invention is employed, provided that the fluorescent lamps 2 and 3 are rated at 0.8 A–60 W and the lighting device is rated at 1.2 A–85 W. Whereas, a curve B is one which is obtained when the control circuit 10 is not used.

In particular, FIG. 5a shows a variation characteristic for light output when the ambient temperature $T_a$ is equal to or more than 15° C. From this curve, it can be understood that the light output variation can be suppressed to ±3% of from the variation of ±30% in the light output of the fluorescent lamp. In short, this exposure valve control system has an ability of absorbing the rising variation of light output developed at the start of the fluorescent lamp when the ambient temperature $T_a$ is equal to or more than 15° C. However, when the ambient temperature $T_a$ becomes less than 10° C., the system can no longer absorb the light output variation at the time of the start of the fluorescent lamp because this variation becomes larger than before as shown in FIG. 5b. In other words, when $T_a$ is below 10° C., the luminous efficiency drops remarkably, so that astable condition will continue to exist for the rising period C corresponding to approximately 0.5 minute.

By the way, in case an automatic compensation for the variation of light output is not required because the ambient temperature under which the fluorescent lamp is used is relatively stable, it may be sufficient to pulse-width modulate the output pulse $V_P$ of the control circuit 10 with the D-C voltage $V_O$ provided by a variable resistor $V_R$ connected to the D-C power source $V_{DC}$ as shown in FIG. 6, instead of the operational amplifiers 11 and 12 of FIG. 3. In such arrangement, the exposure value control can be made by adjusting the voltage $V_O$ by use of a variable resistor.

Figure 7:
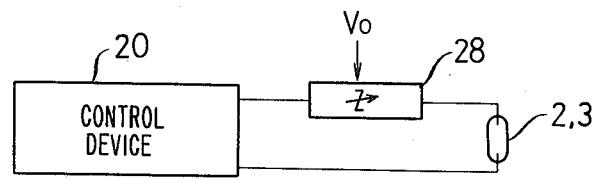
FIG. 7 shows another embodiment of a control circuit for supplying power to the fluorescent lamps.

Although it has been described that, with respect to the two embodiments illustrated in FIGS. 3 and 6, the supply power to the fluorescent lamps is adjusted through a pulse-width modulation, it will be understood that the present invention is not limited thereto, but any other suitable method can be equally utilized. For example, a frequency modulation (In this case, Ti is kept constant and T is varied.—FIG. 4) and the combination of both modulations may be used. FIG. 7 shows another control system. As indicated in the drawing, the lamp current is controlled by inserting a variable impedance element 28 between the lighting device 20 and the fluorescent lamps and adjusting its impedance by use of the D-C voltage $V_O$ explained in conjunction with FIG. 3 or 6. For this circuit, the pulse generator and the modulator in the control circuit 10 become unnecessary. In more details, a reactance element which is capable of being energized by a direct current can be used as an impedance element 28. In this case, the magnitude of energization by d-c current is controlled by the voltage $V_O$. Besides, an ordinary commercial frequency type stabilizer can be employed as a lighting device. For this case, a conventional phase control technique can be used for the control of lamp current. For example, the lamp current can be adjusted by controlling an amount of phase shift of a trigger pulse for phase control by using the voltage $V_O$ explained in connection with FIG. 3 or 6.

As hereinbefore frequently explained, according to the exposure value control system of this invention, an excellent exposure control has become possible because the lamp light output is electrically adjusted with respect to the exposure device with a narrow exposure width as in the case where the focusing fiber lens array is used, and the exposure value control system does not have any complicated mechanisms resulting from conventional mechanical adjustment for exposure and is free from any restrictive conditions from its environment. In addition, the controllability thereof by an operator is highly improved since the uniform variation characteristic for the variation of light output can be obtained when the setting means is moved. Adoption of the fluorescent lamp can avoid the degradation of characteristics of the focusing fiber lens array due to heat because an amount of heat developed thereby is very small. And, if a stabilizer capable of compensating for light outputs automatically is additionally disposed, the occurrence of concentration irregularity will be prevented, and besides, the adoption of a high frequency stabilizer in the lighting device may eliminate effects of fickering in the power source, thus resulting in the provision of good copies.

While, the astable condition represented by the period "C" in FIG. 5 can be eliminated using a lighting device having a power supply capacity of more than 120 W instead of 85 W (1.2 A), but, as stated hereinbefore, the adoption of such large capacity lighting device offers excessive qualities for ordinary operating conditions and provides adverse effects to the life of the lamp. In addition, it is very rare that the temperature around the lamp becomes less than 10° C. For this reason, it is not economical to provide such capacity of the lighting device in anticipation of such infrequent case.

To cope with such infrequent case as described just above, the exposure valve control system is provided with a warning signal generator which notifies the user of the copying machine to the effect that the variation of light outputs exceeds a range of ±30% that may not be stabilized automatically.

Figure 8:
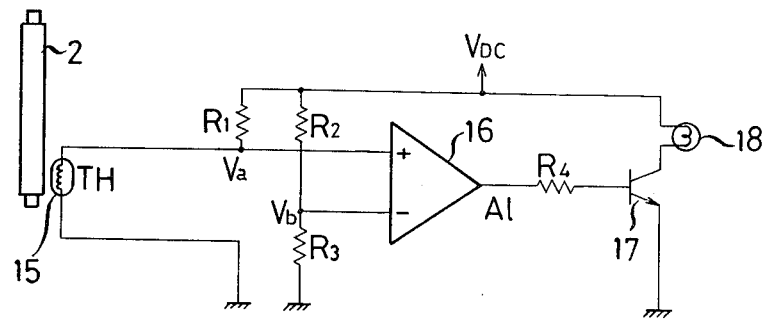
FIGS. 8 and 9 show embodiments of circuits for a warning generator.

FIG. 8 shows one of embodiments of the warning signal generator in accordance with the present invention. A thermistor 15 is used as sensing means for converting the energy of the fluorescent lamp 2 or the lamps 2 and 3 into electrical signals. The thermistor 15 is disposed near the tube wall of the fluorescent lamp 2 to detect the temperature on the tube wall. A resistor $R_1$ is connected to a D-C power source $V_{DC}$ in series with the thermistor 15, and a terminal voltage $V_a$ across the thermistor 15, that is divided by the resistor $R_1$ and the thermistor 15, is applied to the noninverting input terminal of an operational amplifier 16 used as a comparator. At the inverted input terminal of this operational amplifier 16, a reference voltage $V_b$ obtained through a potential divider formed by a series connection of resistors $R_2$ and $R_3$ is provided. The output of the operational amplifier 16 is connected via a resistor $R_4$ to the base of a switching transistor 17 whose emitter is grounded. An indication lamp 18 is inserted in the collector circuit thereof and used as a warning device.

In the case of the fluorescent lamp, there exists a corresponding relationship between the temperature on the tube wall and the variation of light output. When the temperature on the tube wall of the fluorescent lamp is low, the thermistor 15 exhibits high resistance and provides high terminal voltage $V_a$.

As the light output of the fluorescent lamp increases and the temperature on the tube wall rises, the resistance of the thermistor and thus in turn its terminal voltage decrease. Accordingly, if the resistors $R_2$ and $R_3$ are selected properly in their values, the operational amplifier 16 generates a warning signal for the astable period represented by C in FIG. 5b. In this embodiment, the reference voltage $V_b$ is determined to be equal to the terminal voltage $V_a$ of the thermistor that is obtained when the light output of the fluorescent lamp reaches approximately 90% of its steady state.

As the result, during the period that the light output lies within a range of 0-90% of its steady state immediately after the start of the fluorescent lamp, that is, during a rising period of 30 seconds represented by "C" in FIG. 5b, the terminal voltage $V_a$ across the thermistor is higher than the reference potential $V_b$ due to low temperature on the tube wall. Thus, the output of the operational amplifier is kept high (H) or generates a warning signal Al to turn on the transistor 17, so that the warning lamp 18 will continue to light. When the light output exceeds approximately 90% of its steady state and the temperature on the tube wall goes up to the valve corresponding thereto, the terminal voltage $V_a$ becomes smaller than the reference potential $V_b$ to switch the potential level on the output terminal of the operational amplifier 16 to low (L). At the same time, the warning signal Al disappears and the warning lamp 18 is extinguished.

Accordingly, assuming that the user uses the exposure device only after confirming that the lamp 18 is not lit, excellent copies can always be assured. Needless to say, it will be understood that other light-receiving elements such as photodiode, Cds and the like can be used as means for detecting the lighting condition of the lamp.

Figure 9:
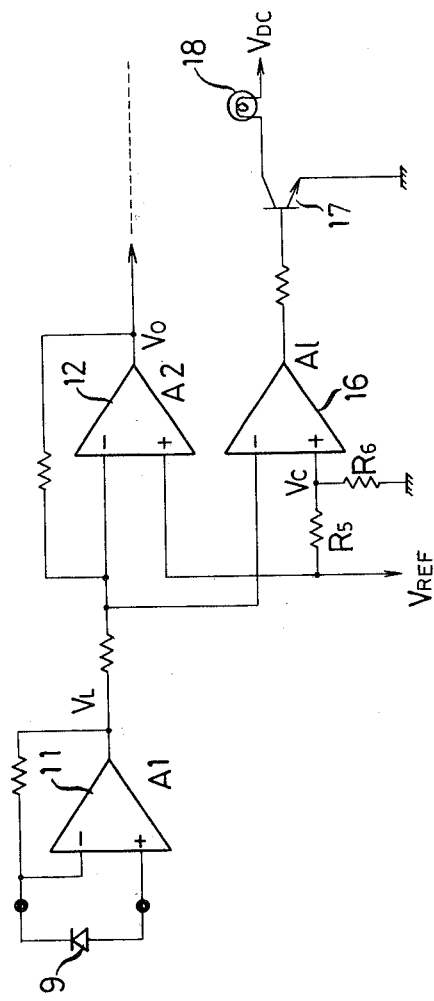

FIG. 9 shows a second embodiment of the warning generator in accordance with the present invention. A differing point from FIG. 8 is that the light-receiving element 9 (FIG. 3) for adjusting and stabilizing the amount of exposure is commonly used as means for detecting its lighting state to simplify the device itself in its entirety. In this arrangement, the inverted input terminal of the operational amplifier 16 is connected to the output of the operational amplifier 11 in the control circuit of FIG. 3, so that the amplifier 16 receives the photo current-voltage conversion output $V_L$ from the operational amplifier 11. The noninverting input terminal of the operational amplifier 16 is connected to a potential divider consisting of resistors $R_5$ and $R_6$ connected to the reference potential $V_{REF}$ for the operational amplifier 12 in the control circuit, so that it receives a reference potential $V_c$ obtained through the potential divider. This reference poftential $V_c$ is set to approximately 90% of $V_{REF}$ by properly selecting the values of the resistors $R_5$ and $R_6$. For the period during which the D-C voltage $V_L$ proportional to the light output of the fluorescent lamp 2 is lower than the reference potential $V_c$, the operational amplifier 16 generates the warning signal Al at high level to light the lamp 18. When the potential $V_L$ exceeds the reference potential $V_c$, the lamp 18 will be extinguished. This function is just similar to that of FIG. 8. Accordingly, for the period up to which the light output of the fluorescent lamp reaches the light output corresponding to approximately 90% of $V_{REF}$, that is, during the period it is under astable state, the lamp 18 will continue to light to notify the user that the machine is not yet placed under its steady state. It will be understood that the detected amount of light output in the fluorescent lamp may be compared with a certain reference potential properly set by use of the output $V_O$ of the next stage operational amplifier, in addition to the output $V_L$ of the operational amplifier 11 in the control circuit 10.

As heretofore described, according to the circuit device illustrated in FIG. 8 or 9, the astable period during which the light output does not reach the given value is notified to the user through the lighting of the lamp, and after the lamp has been diode out, the light output is accurately maintained at the desired valve by the control circuit of FIG. 3. Therefore, the correct use of the exposure device at the stabilized light output is possible without requiring to level up the capacity of the lighting device. This means that the lighting device is prevented from becoming a device of excessive quality and the entire size of the exposure valve control system and the production costs thereof can be made reasonable.

In the abovementioned example, the indication lamp is used as a warning device, but an acoustic signal generator such as a buzzer can also be used. In addition, in the case of the copying machine, the warning signal Al can be utilized not only for warning, but also for banning the use of the exposure device under its non-stable state, namely, prohibition of copying operation during such intervals. To put it concretely, it can be accomplished by a conventional technique that forbids copying operations at the time of the so called "WARMING UP PERIOD FOR FIXING APPARATUS" and "PAPER END" for copying machines. Like these, the copying operation will be performed only under the stabilized light output, so that any erroneous copying operation would be avoided.

Although the exposure value control device equipped with such warning function as described above may be effective for the light output of light source which exhibits sharp rising characteristics as in the case of fluorescent lamp, it will be apparent that the device is also applicable to other discharge lamps and tungsten lamps as well.

What is claimed is:

1. An exposure device for an electrophotographic apparatus, comprising a fluorescent lamp, a fiber array for focusing light from said lamp onto a photosensitive member, means for generating a DC voltage, and means receiving said DC voltage for adjusting the level of current supplied to said lamp according to the level of said DC voltage, including means for supplying power to said fluorescent lamp, said powersupply means including a high-frequency oscillator generating alternating current of a high-frequency for driving said lamp, and said adjusting means including gate means interposed in the currrent supply line to said lamp for periodically preventing current flow to said lamp when said gate means is disabled.

2. An exposure device according to claim 1, said adjusting means further including means for generating a pulse signal for disabling said gate means, and means for setting the duration of said pulse signal according to the level of said DC voltage.

3. An exposure device according to claim 2, said DC voltage generating means including a variable resistor adjusted manually.

4. An exposure device as in claim 2, said DC generating means including a photoelectric element receiving light output from said lamp to generate a voltage level corresponding to the lamp output, means for generating a reference voltage corresponding to a predetermined output of said lamp, and comparator means for comparing said voltage level and said reference voltage for generating said DC voltage at a level corresponding to the difference between said voltage level and said reference voltage.

5. An exposure device according to claim 4, including means including said photoelectric element for indicating when the output of said lamp is below a predetermined level.

6. An exposure device for an electrophotographic apparatus, comprising a fluorescent lamp, a fiber array for focusing light from said lamp onto a photosensitive member, means for generating a DC voltage, and means receiving said DC voltage for adjusting the level of current supplied to said lamp according to the level of said DC voltage, including means supplying power to said lamp, said powersupplying means including a high-frequency oscillator for generating alternating current of a high frequency for driving said lamp, and said adjusting means including a variable impedance element interposed in the current supply line to said lamp, and means for adjusting the impedance level of said impedance element according to the level of said DC voltage.

* * * * *